United States Patent [19]

Shibazaki et al.

[11] Patent Number: 5,246,111

[45] Date of Patent: Sep. 21, 1993

[54] MAGAZINE FOR ROLL-TYPE PHOTOSENSITIVE MATERIAL

[75] Inventors: Osamu Shibazaki; Toshiyuki Ikariya; Masao Ishikawa, all of Hino, Japan

[73] Assignee: Konica Corporation, Tokyo, Japan

[21] Appl. No.: 837,811

[22] Filed: Feb. 18, 1992

[30] Foreign Application Priority Data

Feb. 20, 1991 [JP] Japan ................ 3-26508

[51] Int. Cl.$^5$ ............................ G03B 27/58
[52] U.S. Cl. ............... 206/409; 206/397; 206/408; 242/55.53; 355/72
[58] Field of Search .......... 242/71.1, 55.53; 354/275; 206/408, 409, 397; 355/72

[56] References Cited

U.S. PATENT DOCUMENTS

| | | | |
|---|---|---|---|
| 2,329,989 | 2/1943 | Hilquist | 242/71.1 |
| 2,372,245 | 3/1945 | Avery | 206/408 |
| 2,935,190 | 5/1960 | Braun | 242/71.1 |
| 3,166,187 | 1/1965 | Araujo | 206/397 |
| 4,294,357 | 10/1981 | Stevens et al. | 206/409 |
| 4,444,313 | 4/1984 | Tyson | 206/408 |
| 4,671,409 | 6/1987 | Esey | 206/397 |
| 4,787,506 | 11/1988 | Akao | 242/71.1 |
| 4,903,835 | 2/1990 | Beery | 242/195 |
| 4,947,472 | 8/1990 | Maeda | 355/72 |
| 5,053,811 | 10/1991 | Watabe et al. | 206/397 |

FOREIGN PATENT DOCUMENTS 463147 10/1947 Canada ................ 206/408

Primary Examiner—Thomas B. Will
Attorney, Agent, or Firm—Jordan B. Bierman

[57] ABSTRACT

A magazine for a roll-type of photosensitive material having: an inner holder including a back plate made of paper; side plates made of paper connected with both sides of the back plate; supporting members each composed of plural accumulated disks and made of paper for supporting both ends of a spool around which the photosensitive material is wound; and a lightproof box made of paper to cover the inner holder. A slit through which the photosensitive material is pulled out is formed by a folded portion of the back plate and a lid portion of the lightproof box. A lightproofing material is provided to the folded portion of the back plate and the lid portion of the lightproof box at the slit. The supporting members are pivotally held by the side plates through a metallic or a synthetic resin shaft.

8 Claims, 9 Drawing Sheets

MAGAZINE FOR ROLL-TYPE PHOTOSENSITIVE MATERIAL

BACKGROUND OF THE INVENTION

The present invention relates to improvements in a magazine for a roll-type of photosensitive material which is fed to an exposure section of a printer.

According to a conventional method, a photosensitive material is supplied to a printer in such a manner that: the photosensitive material is loaded in a light-shielded box and an end of the photosensitive material is pulled out from a light-shielded slit formed on the box so that the photosensitive material can be loaded or pulled out without being sensitized when it is handled roomlight. The following two kinds of magazines have been conventionally used for the magazine to accommodate a photosensitive material.

(a) An operator puts a photosensitive material into a magazine attached to the apparatus in a darkroom, and then sets the magazine to a printer in a roomlight. This magazine is referred to as a reusable magazine.

(b) A manufacturer delivers a photosensitive material in a magazine, and a user sets the magazine to a printer as it is. This magazine is referred to as a disposable magazine. In the case of the reusable magazine, the cost is high, and further it takes time and labor for the user to accommodate the photosensitive material in the reusable magazine. Accordingly, the disposable magazine is preferably used, and the one shown in FIG. 13 is proposed. This magazine is composed in such a manner that: a box 22 is made of two outer shells 21 of plastic; a photosensitive material which is wound around a spool 23 is accommodated in the box 22; end plates 24 made of plastic are fixed to both sides of the spool 23; and shafts 25 formed on the end plates 24 are supported by bearings 26 formed on the outer shell 21. The magazine is disclosed in the official gazette of Patent No. 2503400 of France.

As shown in FIG. 13, a light-shielding box of the conventional magazine is made of plastic, and further its structure is complicated, so that the manufacturing cost is high. Therefore, it is wasteful to dispose of this type of magazine.

The magazine is made of plastic, so that it is disadvantageous when it is discarded after it has been used.

SUMMARY OF THE INVENTION

The present invention has been achieved to solve conventional problems. It is a primary object of the present invention to provide a disposable magazine for a roll-type of photosensitive material, characterized in that: the light-shielding property is sufficient when the magazine is fitted to a printer in a daylight room; a load can be reduced when a photosensitive material of large diameter is pulled out; the cost is low; and the magazine can be easily discarded.

The object can be accomplished by one of the following technical means.

(a) A magazine for roll-type photosensitive material comprising: an inner holder having a back plate made of paper, side plates made of paper connected with both edges of said back plate, and supporting members provided on said side plates, for supporting both ends of a spool around which photosensitive material is wound; and a lightproof box made of paper to cover said inner holder, wherein a slit to pull out said photosensitive material is formed by a folded portion of said back plate and a lid portion of said lightproof box, and a lightproof material is applied onto a passageway forming surface of said slit, and said supporting member is formed of accumulated disks made of paper and pivotally supported by said inner holder through a metallic or a synthetic resin shaft.

(b) The magazine for roll-type of photosensitive material according to item (a), wherein said accumulated disks are rotatably supported by said inner holder through a metallic or a synthetic resin shaft.

(c) The magazine for roll-type photosensitive material according to item (a), wherein said accumulated disks include a disk, the diameter of which is smaller than the inner diameter of said spool and a disk, the diameter of which is approximately the same as the inner diameter of said spool so as to come into contact with the inner surface of said spool, and said accumulated disks are rotatably supported by said side plate.

(d) The magazine for roll-type photosensitive material according to item (b) or (c), wherein a lubricant is applied onto the surface of said shaft made of synthetic resin which rotatably supports said disk.

(e) The magazine for roll-type photosensitive material according to item (b) or (c), wherein a sintered metal impregnated with a lubricant is utilized for said metallic shaft which rotatably supports said disks.

DESCRIPTION OF THE PREFERRED EMBODIMENTS

Referring now to the attached drawings, the structure of the present invention will be explained.

Figure 3:
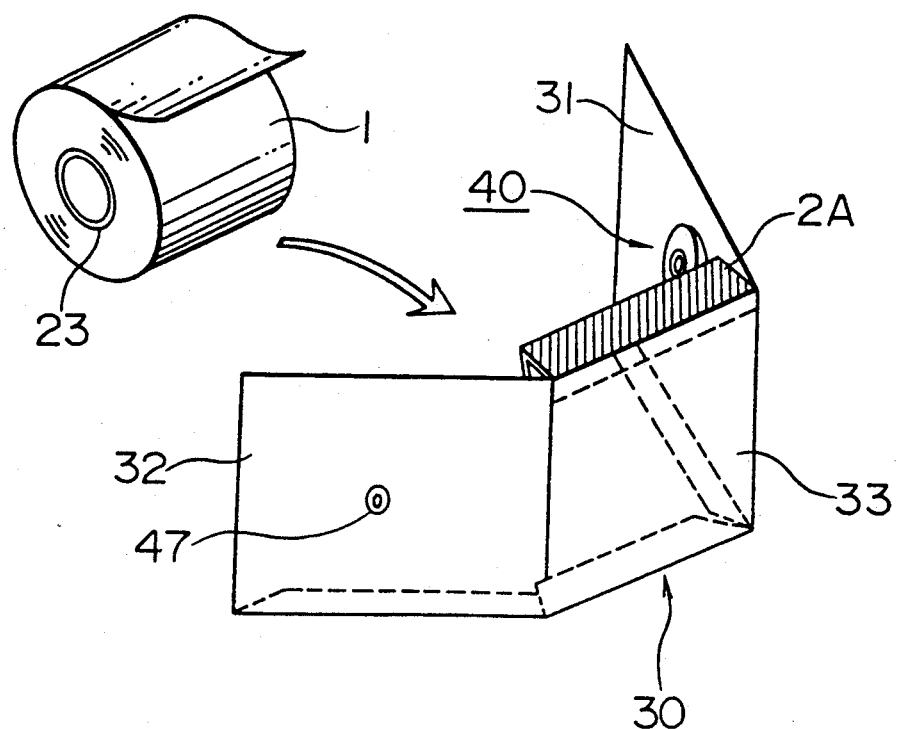
FIG. 3 is an exploded perspective view of an inner holder of the example.
Figure 4:
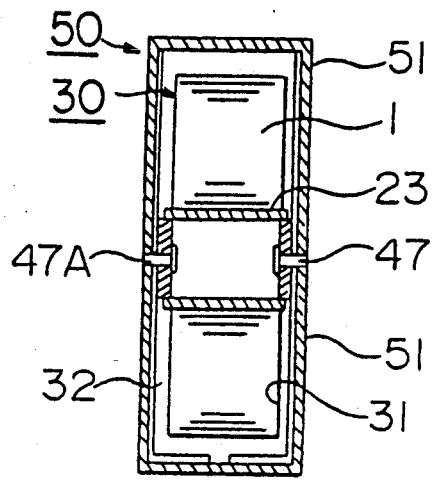
FIG. 4 is a sectional view of the example.

As shown in the exploded perspective views of of FIGS. 3 and 4, a roll of a photosensitive material 1 wound around a spool 23 is rotatably supported in such a manner that: disks 40 are provided to the inside diameter portions on both sides of the spool 23 so that the spool 23 can be supported; shafts 47 are provided to the disks 40; and the shafts 47 are supported by side plates 31, 32 of an inner holder 30. Otherwise, the disk 40 may be fixed to the inner holder 30 through the shafts 47 and retainers 47A, and the spool 23 may be rotated with regard to the disks 40. Both side plates 31, 32 of the inner holder 30 are folded to make a right angle with a back plate 33. A lightproof material 2A is adhered upon folded portions 35A, 35B of the upper portion of the back plate 33 except for a portion 35C. Flaps 34A, 34B, 34C of the side plates 31, 32 and back plate 33 are folded making a right angle. Function of the flaps is reinforcement and light-shielding.

Figure 1:
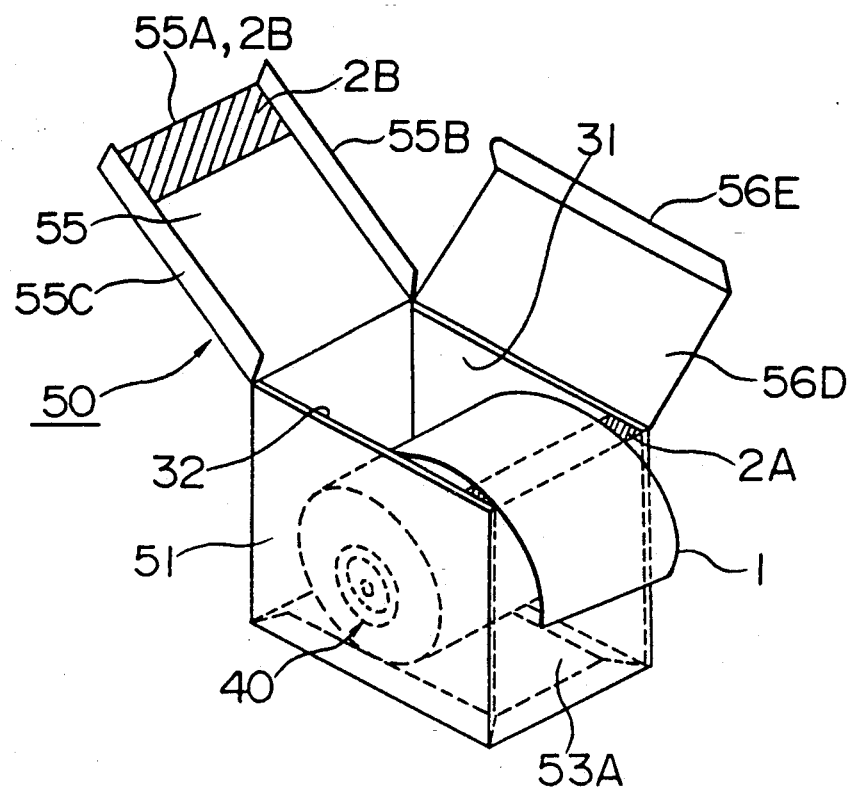
FIG. 1 is a developed perspective view of an example of the present invention.
Figure 2A:
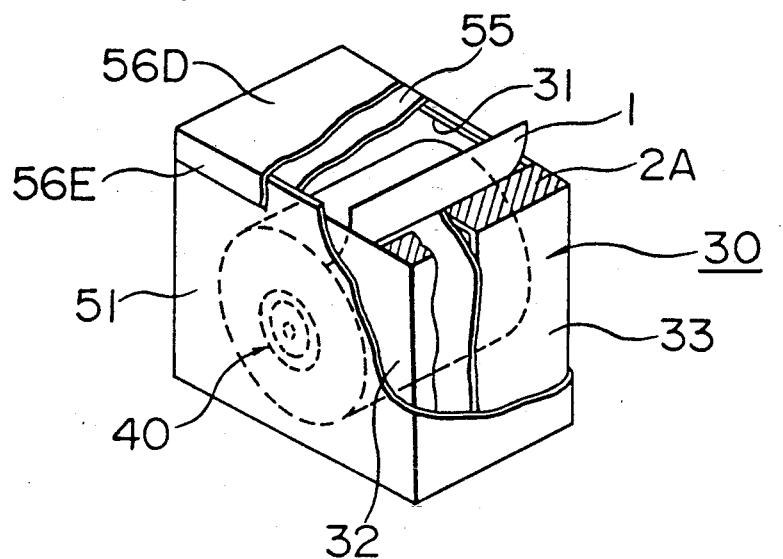
FIG. 2(a) is a partially sectional perspective view of the example.

As shown in FIG. 1, which is a developed perspective view, and FIG. 2(a), which is a partially sectional perspective view, the inner holder 30 is set in a lightproof box 50, and an inner lid 55 is closed, wherein flaps 55B and 55C of the inner lid 55 are folded inside making a right angle, and a flap 55A is folded inside by an angle of 180°. A lightproof material 2B is adhered on the flap 55A and a portion of the inner lid 55. The flaps 34A, 34B, 34C formed in the bottom portion of the inner holder 30 are placed on the bottom surface of the lightproof box 50, so that reinforcement and light-shielding can be enhanced.

Figure 2B:
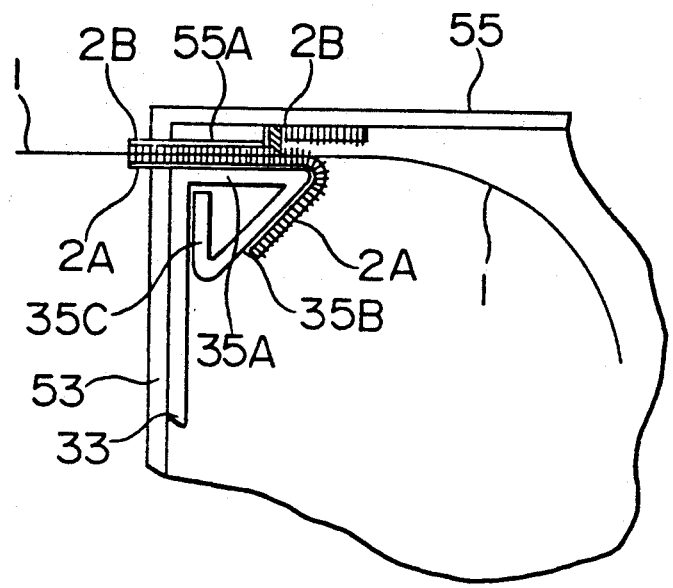
FIG. 2(b) is a partially sectional view of the example.

As shown in FIG. 2(b), which is a partial sectional view, the lightproof material 2A adhered on the folded portions 35A, 35B of the inner holder 30, and the lightproof material 2B adhered on the flap 55A of the lightproof box 50 and the inner lid 55, pinches a passageway of the photosensitive material 1, so that it can be shielded while running smoothly.

FIG. 4 is a sectional view showing the inner holder 30 accommodated in the lightproof box 50, wherein the roll 1, a roll-shaped photosensitive material, is pivotally supported by the inner holder 30.

Figure 5A:
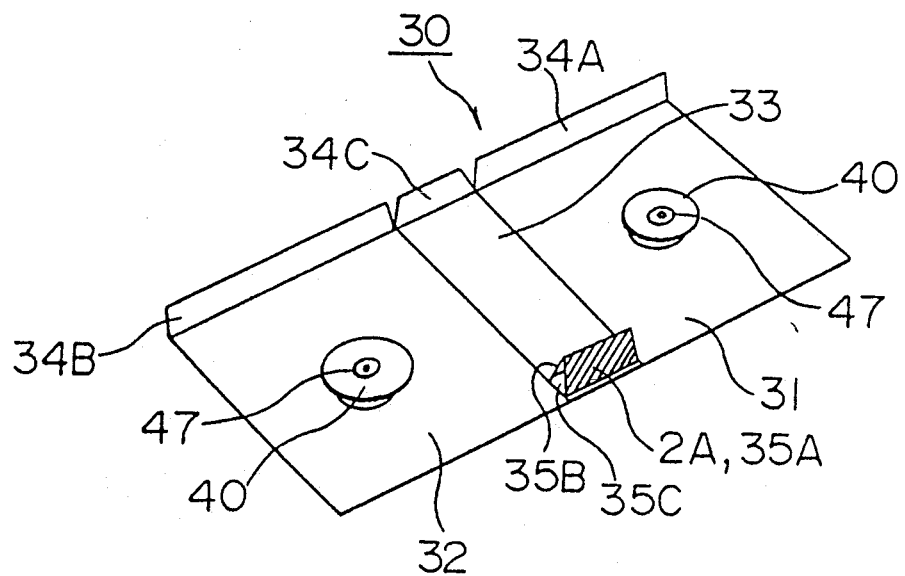
FIG. 5(a) is a developed perspective view of the inner holder of the example.
Figure 5B:
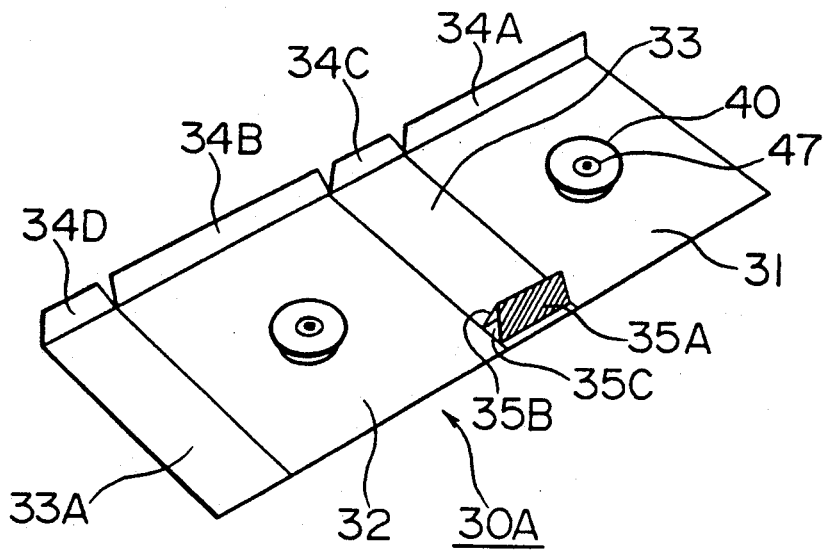
FIG. 5(b) is a developed perspective view of an inner holder of another example.

FIG. 5(a) is a developed perspective view of the inner holder 30, the side plates 31, 32 of which rotatably support the shaft 47 to which the disk 40 is fixed. FIG. 5(b) is a developed perspective view showing an inner holder 30A which is composed in such a manner that: a front plate 33A is provided to a surface opposed to the back plate 33 of the inner holder 30A so that the inner holder 30A has a shell-structure to reinforce its strength. Front plate 33A is formed with flap 34D which has the same function as flaps 34A, 34B, and 34C.

Figure 7:
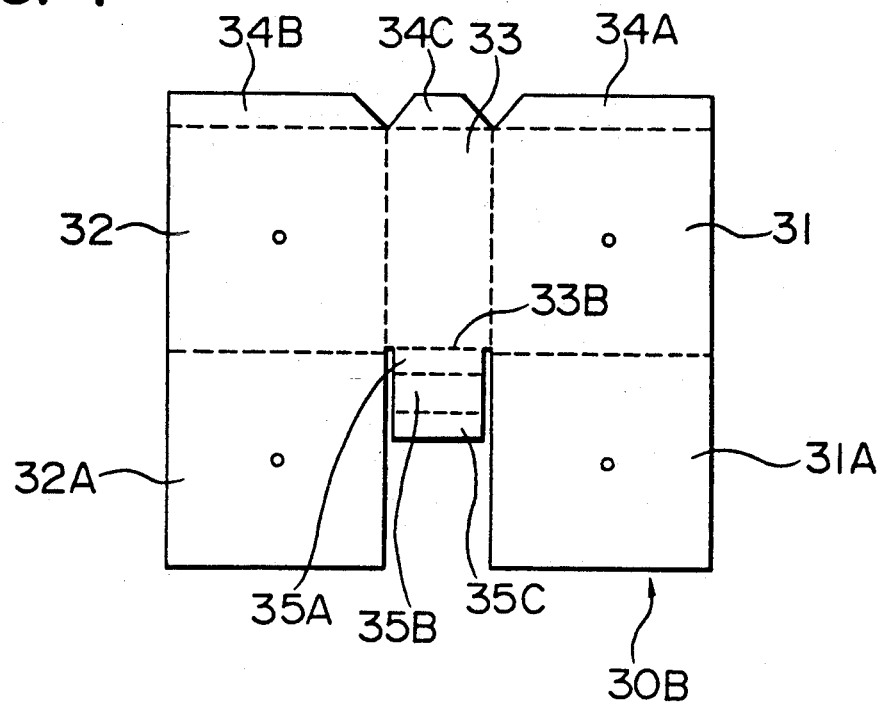
FIG. 7 is a developed view of an example of the inner holder in the present invention.

FIG. 7 is a developed view showing an inner holder 30B in which the side plates 31, 32 of the inner holder 30B are reinforced in such a manner that the side plates 31A, 32A are folded.

Figure 8:
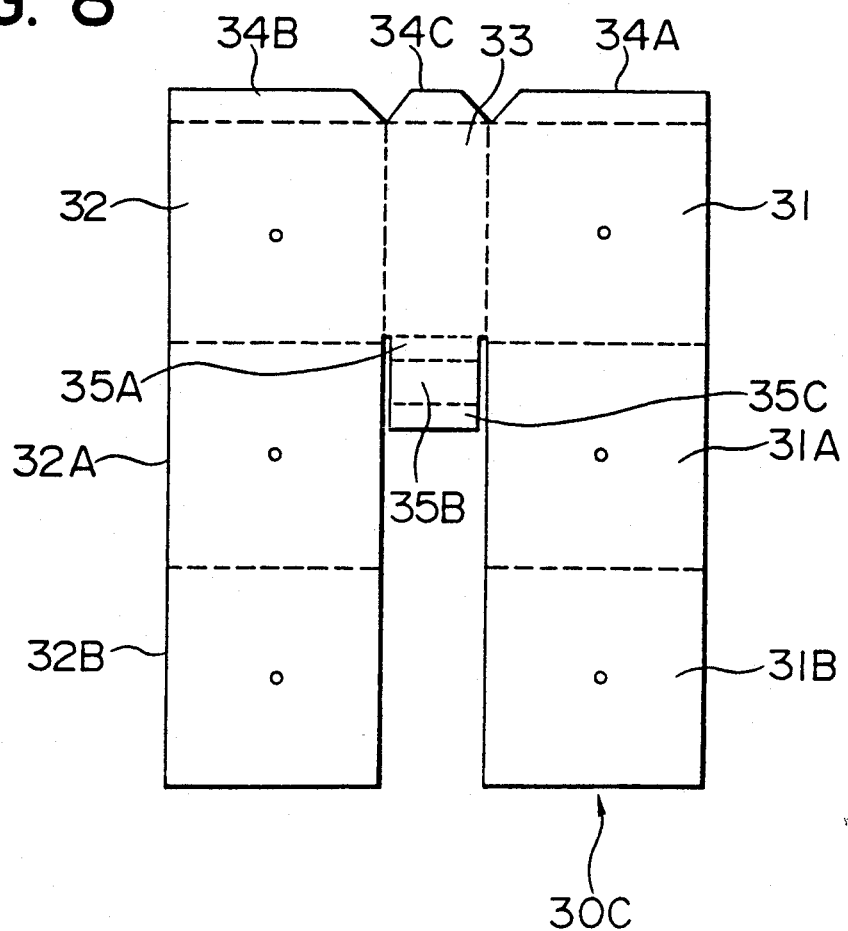
FIG. 8 is a developed view of another example of the inner holder in the present invention.

FIG. 8 is a developed view of an inner holder 30C in which the side plates 31, 32 of the inner holder 30C are reinforced in such a manner that side plates 31A, 31B, 32A, 32B are folded.

Strengths of the inner holders 30A, 30B, 30C are higher than that of inner holder 30, so that they are appropriate to accommodate a larger roll of photosensitive material. Since the inner holder is composed in the manner described above, leakage of light caused by pin holes of folding portions can be eliminated and fog of photosensitive material is remarkably reduced.

Figure 6:
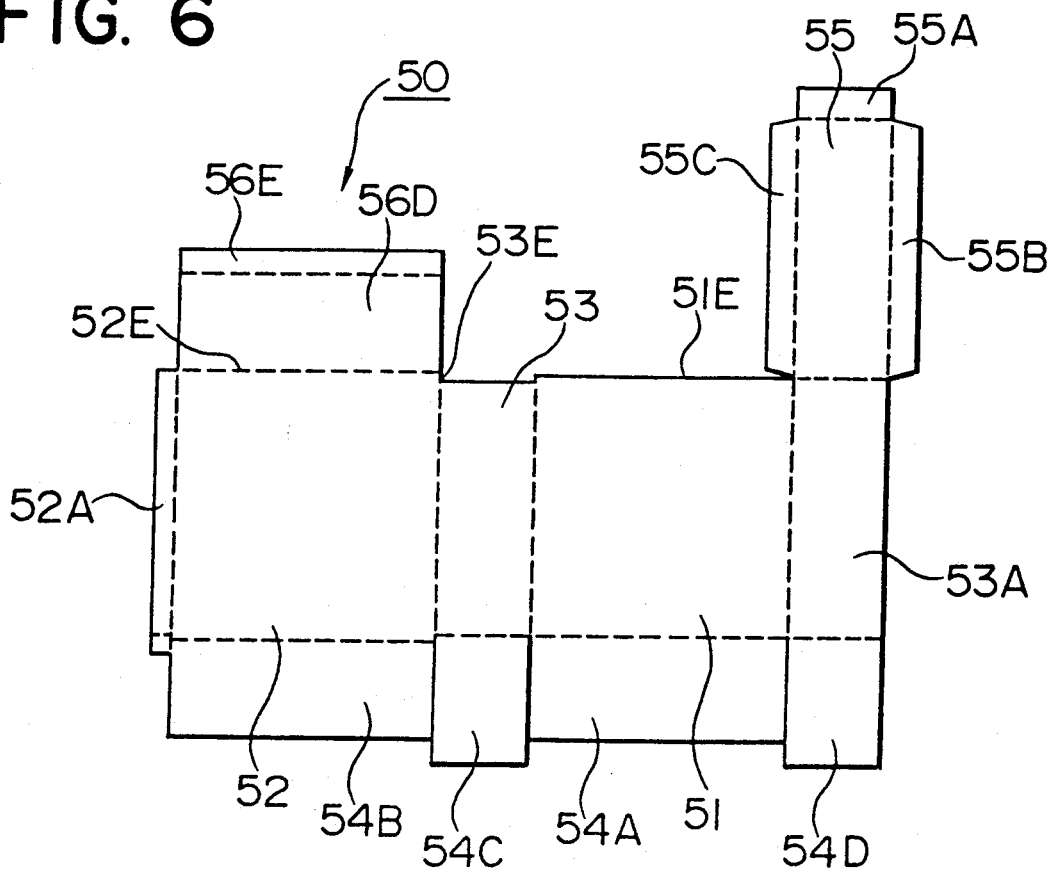
FIG. 6 is a developed view of an example of a light-shielding box in the present invention.

Next, a developed view of the lightproof box 50 is shown in FIG. 6.

Figure 11:
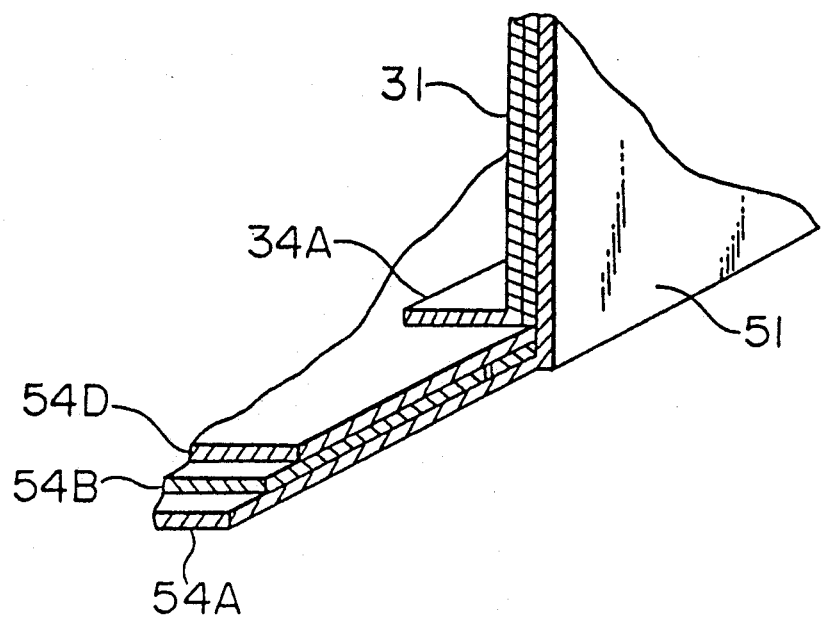
FIG. 11 is a partially sectional perspective view of a bottom portion of a magazine in the present invention.
Figure 12:
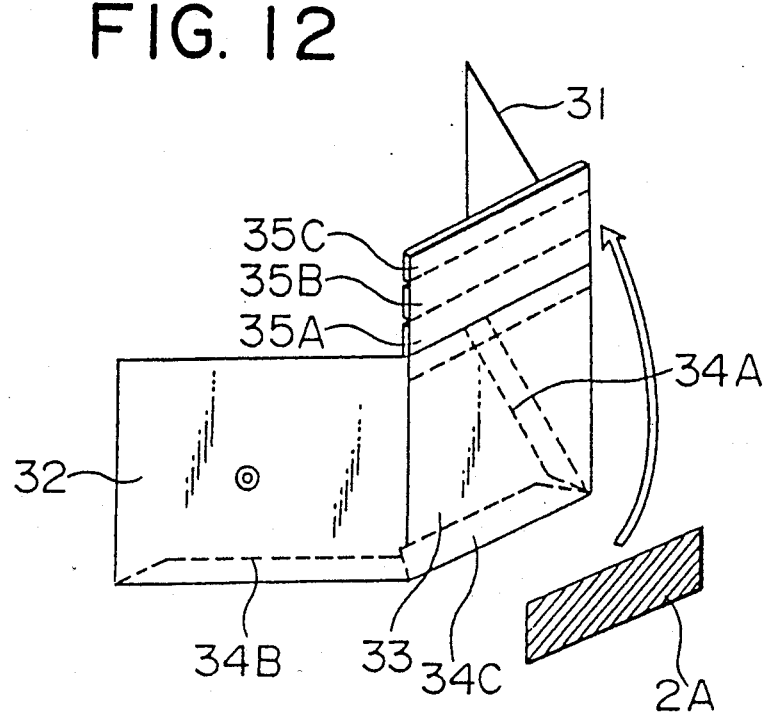
FIG. 12 is an exploded perspective view of an inner holder in the present invention.
Figure 13:
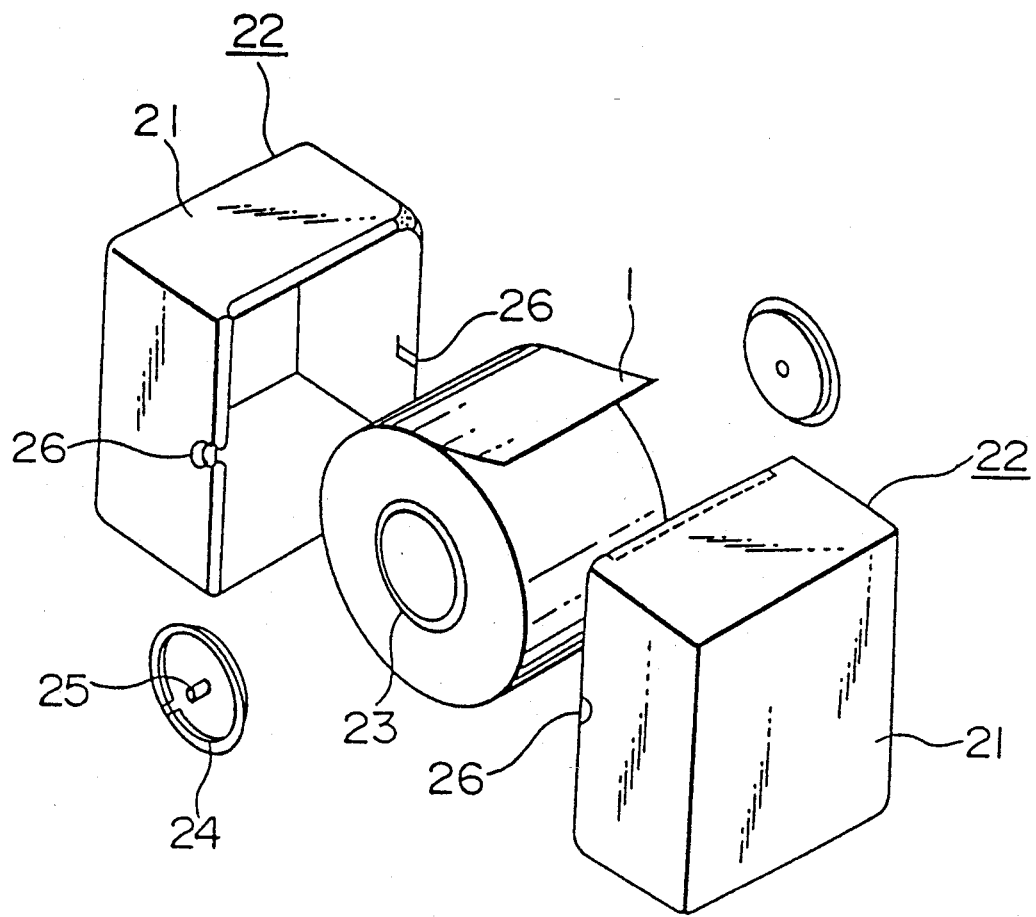
FIG. 13 is an exploded perspective view of a conventional magazine for a roll-type of photosensitive material.

A back plate 53, a front plate 53A opposed to the back plate 53, and side plates 51, 52 are laterally disposed so as to form a line. Flaps 54C, 54D of the bottom plate are respectively connected with the back plate 53 and the front plate 53A, and flaps 54A, 54B are connected with the side plates 51, 52. Each flap is folded at a portion designated by a dotted line. Since the flaps 54C, 54D form one sheet of bottom plate and the flaps 54A, 54B form two sheets of bottom plates, the bottom plate of the lightproof box 50 has a threefold structure as shown in a partial sectional view of FIG. 11.

An inner lid 55 is provided in the upper portion of the front plate 53A as a flap. The inner lid 55 is provided with small flaps 55A, 55B, 55C. As described before, the flap 55A is folded by an angle of 180° to form an inlet and outlet for photosensitive material, and lightproof material is adhered onto the flap 55A. The flaps 55B, 55C are bent at a portion designated by a dotted line to make a right angle, and used for an inserting portion when the inner lid 55 is set. A flap 56D is bent at a portion designated by a dotted line so that it makes a right angle with the side plate 52 and forms an outer lid. Further, a small flap 56E is bent by an angle of 90°, and adhered onto the side plate 51 of the lightproof box by an adhesive agent. A small flap 52A of the side plate 52 is also adhered onto the front plate 53A of the lightproof box 50. The lightproof box 50 is formed in the aforementioned manner.

As illustrated in FIG. 6, an edge portion 53E of the back plate 53 is lower than an upper edge portion 51E of the side plate 51 and an upper folding line 52E of the side plate 52. Height of the edge portion 53E is approximately the same as that of the folded portion 35A which has been folded by an angle of 90°. Due to the difference in height between the upper edge portion 51E and the side plates 51, 52, an inlet and outlet for the photosensitive material can be formed, and lightproof material is adhered on this portion so that a lightproof state can be always maintained.

Figure 9:
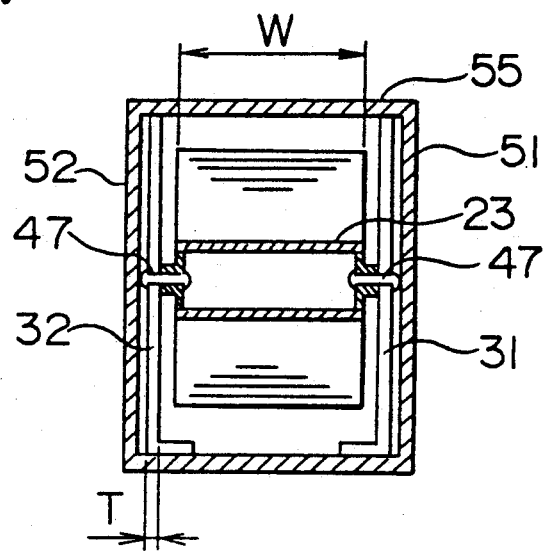
FIGS. 9(a) and 9(b) are respectively sectional views of two examples of the present invention.
Figure 9:
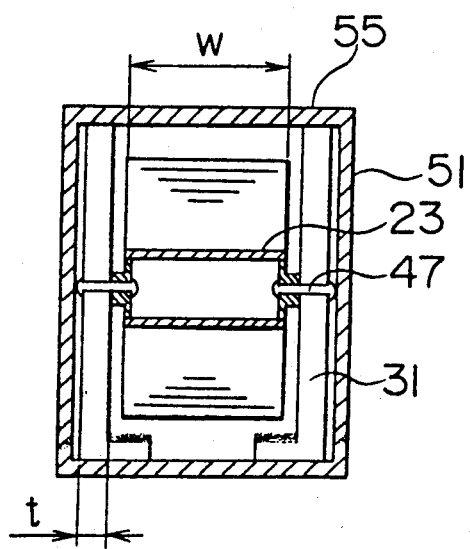

Width of roll-shaped photosensitive material 1 varies in a wide range from a wide width to a narrow width. It is very hard to prepare various sizes of inner holder 30 and lightproof box 50 to accommodate various sizes of photosensitive material. Accordingly, in the present invention, the size of the lightproof box is fixed in order to solve the problem. The fixation of size will be explained with reference to the sectional views shown in FIGS. 9(a) and 9(b). Suppose that there are two kinds of photosensitive material, one has a width of W, and the other has a width of w. In this case, the former is accommodated in an inner holder, the side plate thickness of which is set to be T, and the latter is accommodated in the inner holder, the side plate thickness of which is set to be t, wherein the relation between T and t can be expressed by an inequality of $T < t$. As explained in developed views of FIGS. 7 and 8, the number of side sheets may be increased instead of increasing the thickness of the side plate.

However, a more appropriate method will be described as follows: As shown in the exploded sectional view of FIG. 10(a) and the sectional assembling view of FIG. 10(b), a large number of thin disks of the same thickness are prepared to form one disk, and the number of accumulated disks is determined according to difference $W-w$ in the width of photosensitive material.

Figure 10A:
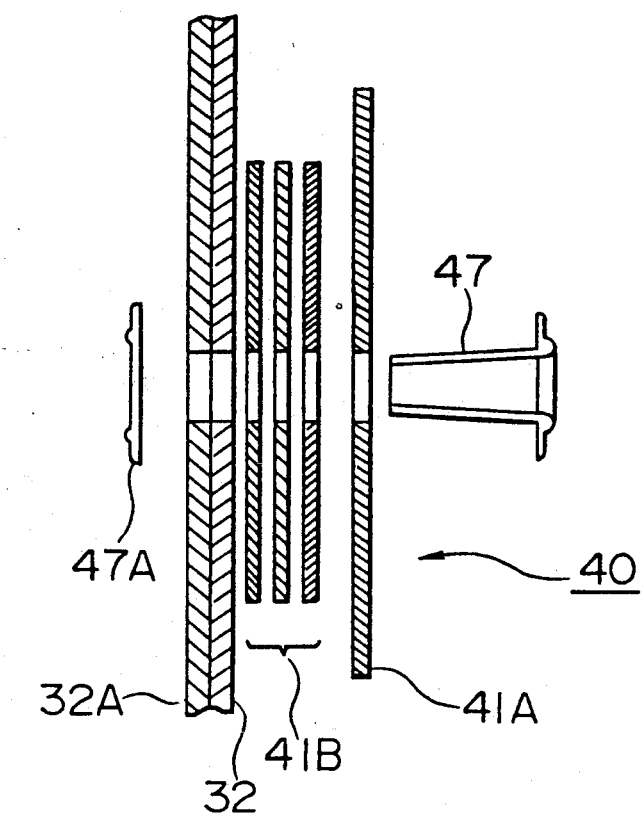
FIG. 10(a) is an exploded sectional view of an example of the disk in the present invention.
Figure 10B:
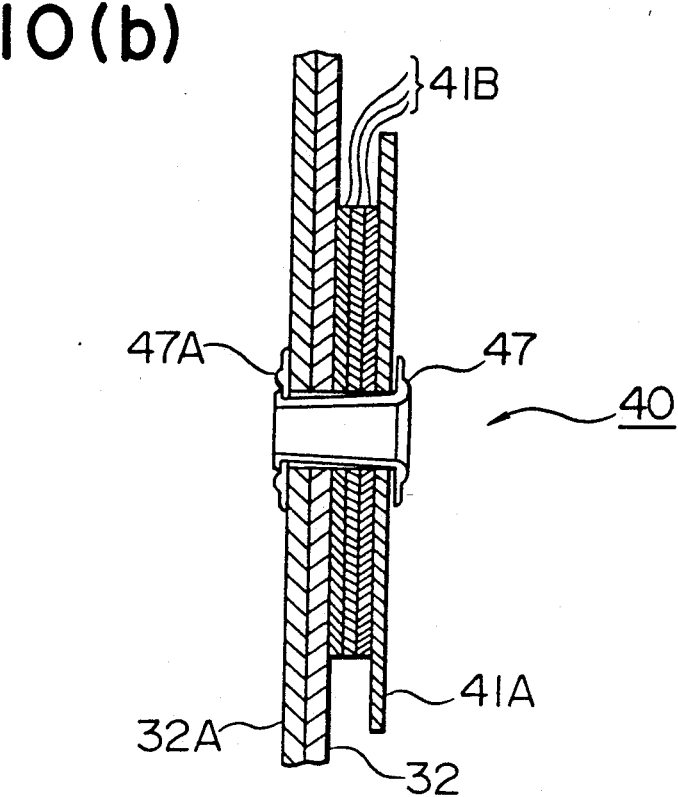
FIG. 10(b) is an assembled sectional view of the example.

In the case shown in FIGS. 10(a) and 10(b), the side plate is composed of two plates 32, 32A. While the side plate composed of two plates is used, a large number of small disks 41B, the size of which is the same, and one large disk 41A are provided. The disks and side plate are coaxially engaged with a shaft 47 and retainer 47A, and the engaged disks can be rotated around the shaft 47. In this case, the disk 41A of a large diameter is engaged with the inner circumferential surface of a spool 23. According to the structure, roll-shaped photosensitive materials of various widths can be relatively simply accommodated in the inner holder at low cost. Of course, the size of the small disk may be the same as that of the large disk. When a slippery condition is maintained on the surface between the shaft 47 and the inner circumferential surface of the disks 41A, 41B in order make the coefficient of friction small, the force necessary to pull out a roll-shaped photosensitive material can be reduced, so that the photosensitive material can be supplied smoothly. For example, a sintered metal containing a lubricant can be utilized for the material of the shaft 47, and it is effective to apply a minute amount of silicone oil to the inner circumferential portion of the disk 40 and the peripheral surface of the shaft 47.

Not only the sintered metal (an oil containing metal) but also other metals and plastics can be utilized for the materials of the shaft 47 and the retainer 47A. The material is preferably provided with lightproof property. Accordingly, in the case of plastics, carbon is preferably blended in the material in order to improve lightproof property.

Paper or plastic is preferably used for the disk, because the lightproof box 50 and inner holder 30 of the disposable magazine are mainly made of paper and the used paper can be recycled. If possible, metal or plastic of the shaft 47 and retainer 47A, cloth of the lightproof material 2A, 2B, and plastics of the disks 41A, 41B are preferably separated from the recycled paper, so that purity can be improved and the recycling operation can be positively performed. For that reason, it is effective to provide perforations on the lightproof box 50 so that the metallic or plastic portion can be easily separated. In order to peel off the light proof material easily, an inside portion of the light proof material provided to the inlet for the photosensitive material is not preferably adhered. A hot melt adhesive or both-sided adhesive tape can be utilized for the adhesive agent. Even when perforations are formed on the magazine, leakage of light is not caused at all since the side plates and flaps of the lightproof box 50 have a double-structure or triple structure.

When cardboard, which is composed of two sheets of paper and a reinforcement provided between them, is used for paper to make the magazine, perforations are preferably formed on only one of the sheets.

Due to the foregoing, lightproofing can be attained more positively, and the shaft portion can be clearly and easily separated even when perforations are formed on only one of sheets.

Portions of the inner holder 30 and lightproof box 50 which are opposed to the roll-shaped photosensitive material are preferably made of black paper.

The disk 40, and its mounting members of the shaft 47 and retainer 47A, are independent parts. Accordingly, the magazine can be easily dismounted by removing the two parts. Even when the disk 40 is made of plastic and other materials, it can be simply dismounted and separated.

The outside of the flap 56E of the outer lid 56D may be adhered by an adhesive agent, or the flap 54E may be inserted into the inside of the outer box.

According to the present invention, the following effects can be provided:

(a) The basic material of the magazine is paper, and the disk and shaft which function as lightproof material and a spool supporting member, are made so that they can be separated from the magazine. Accordingly, disposal can be performed according to the kind of material, and recycling can be effectively carried out.

(b) When a roll-shaped photosensitive material, the diameter of which is large, is pulled out from a magazine, the force to pull the photosensitive material can be reduced.

(c) When the number of accumulated disks is adjusted, photosensitive materials of a plurality of sizes can be accommodated in the magazine, and the supporting strength of the photosensitive material can be improved.

(d) The lightproof box is composed of an inner and outer holder, so that the number of essential parts is small and the magazine can be simply manufactured.

(e) The upper and lower surfaces of the lightproof material are folded, and the side has a double structure composed of the side of the inner holder, and further the bottom has a double structure composed of the flap of the inner holder. Consequently, the lightproof property is improved so as to be sufficient.

What is claimed is:

1. A magazine for a roll-type photosensitive material, comprising:
    (a) an inner holder having;
        (1) a paper back plate having a folded portion formed along a first side edge thereof,
        (2) first and second paper side plates attached to a second side edge and an opposite third side edge of said back plate, respectively,
        (3) a spool around which said photosensitive material is wound,
        (4) first and second supporting members, each including a plurality of paper disks, provided on said first and second paper side plates, respectively, for supporting a first and second end of said spool, respectively, and
        (5) first and second shafts provided on each of said first and second paper side plates, respectively, for pivotally holding said first and second supporting members, respectively;
    (b) a light-proof box having a lid portion for covering said inner holder, wherein a slit through which said photosensitive material is pulled out is formed by said folded portion of said back plate and said lid portion of said light-proof box; and
    (c) a light-proofing material provided on said folded portion and said lid portion at a position corresponding to said slit.

2. The magazine of claim 1, wherein said plurality of paper disks comprise a first disk, the diameter of which is smaller than the inner diameter of said spool and a second disk, the diameter of which is substantially the same as the inner diameter of said spool, said second disk coming into contact with the inner surface of said spool.

3. The magazine of claim 1, wherein said shaft comprises one of a metal and a synthetic resin.

4. The magazine of claim 2, wherein a lubricant is applied onto the surface of said shaft.

5. The magazine of claim 3, wherein a lubricant is applied onto the surface of said shaft made of synthetic resin.

6. The magazine of claim 2, wherein a sintered metal impregnated with a lubricant is utilized for said shaft.

7. The magazine of claim 3, wherein a sintered metal impregnated with a lubricant is utilized for said shaft made of metal.

8. The magazine of claim 1, wherein different widths of photosensitive materials can be accommodated in said inner holder by changing at least one of the thickness of said inner holder and the number of said plurality of paper disks.

* * * * *